United States Patent [19]

Swanda

[11] Patent Number: 5,157,842
[45] Date of Patent: Oct. 27, 1992

[54] LEVEL WITH BALL ROLLING ON ARCUATE SURFACES

[76] Inventor: Richard L. Swanda, 1609 S. 27th Pl., Rogers, Ark. 72756

[21] Appl. No.: 824,919

[22] Filed: Jan. 22, 1992

[51] Int. Cl.$^5$ .......................... G01C 9/10; G01C 9/36
[52] U.S. Cl. ........................................ 33/365; 33/390
[58] Field of Search .................................. 33/365, 390

[56] References Cited

U.S. PATENT DOCUMENTS

| | | | |
|---|---|---|---|
| 1,361,367 | 12/1920 | Coxey | 33/365 X |
| 2,305,678 | 12/1942 | Cravaritis et al. | 33/390 X |
| 2,568,143 | 9/1951 | Casper | 33/390 |
| 2,826,823 | 3/1958 | Hagner | 33/365 |

FOREIGN PATENT DOCUMENTS

| | | | |
|---|---|---|---|
| 40184 | 3/1958 | Poland | 33/390 |
| 318872 | 3/1957 | Switzerland | 33/390 |

*Primary Examiner*—Harry N. Haroian
*Attorney, Agent, or Firm*—Young & Thompson

[57] ABSTRACT

Briefly stated, the present invention provides a level with a ball rolling on inclined surfaces, the level comprising a window through which the ball can be observed. Reference marks are positioned on the window so as to indicate the horizontal and/or vertical positions of a reference line visible through the window. The level has two spaced transparent lenses or glasses between which the rolling ball is disposed. These can be flat or convex; and if convex, a centrally located reference mark can be provided which indicates the inclination of a surface on which the level rests on its side, that is, with the line of sight through the lenses disposed vertically. This same reference mark, when the lenses are not convex but rather flat, can serve as a target mark for helping to aim the level. In a preferred embodiment, the level has a frame which is square, and the arcuate surfaces are inwardly concave and have a radius of curvature substantially greater than the greatest distance from the concave surface to the center of the level, so that the four concave surfaces meet in obtuse angles adjacent the corners of the level. When this embodiment is also provided with convex lenses, then the level can rest on either major face thereof or on any of the four sides of the level, to provide an indication of the true vertical and/or horizontal in any of the six possible orthogonally oriented positions thereof.

2 Claims, 1 Drawing Sheet

LEVEL WITH BALL ROLLING ON ARCUATE SURFACES

FIELD OF THE INVENTION

The present invention relates to a level with a ball rolling on arcuate surfaces, the position of the ball relative to reference marks giving a visual indication of the true horizontal and/or vertical. The invention has particular utility for use in connection with the game of golf, wherein it is often desired to establish an artificial horizon for indicating to the player the slope of a golf green.

OBJECTS OF THE INVENTION

It is accordingly an object of the present invention to provide a level with a ball rolling on arcuate surfaces, which readily indicates the location of the true vertical and/or horizontal.

It is also an object of the present invention to provide a level with a ball rolling on arcuate surfaces, which indicates the deviation of a surface from the horizontal in any direction of inclination.

Still another object of the present invention is the provision of a level with a ball rolling on inclined surfaces, which is useful to establish an artificial horizon for viewing by golf players to determine the inclination of a golf green.

A still further object of the present invention is the provision of a level with a ball rolling on inclined surfaces, which is usable to give meaningful indications in any of the six possible orthogonal positions thereof.

Finally, it is an object of the present invention to provide a level with a ball rolling on inclined surfaces, which will be simple and inexpensive to manufacture, easy to use and to read, and rugged and durable in use.

SUMMARY OF THE INVENTION

Briefly stated, the present invention provides a level with a ball rolling on inclined surfaces, the level comprising a window through which the ball can be observed. Reference marks are positioned on the window so as to indicate the horizontal and/or vertical positions of a reference line visible through the window.

The level has two spaced transparent lenses or glasses between which the rolling ball is disposed. These can be flat or convex; and if convex, a centrally located reference mark can be provided which indicates the inclination of a surface on which the level rests on its side, that is, with the line of sight through the lenses disposed vertically. This same reference mark, when the lenses are not convex but rather flat, can serve as a target mark for helping to aim the level.

In a preferred embodiment, the level has a frame which is square, and the arcuate surfaces are inwardly concave and have a radius of curvature substantially greater than the greatest distance from the concave surface to the center of the level, so that the four concave surfaces meet in obtuse angles adjacent the corners of the level. When this embodiment is also provided with convex lenses, then the level can rest on either major face thereof or on any of the four sides of the level, to provide an indication of the true vertical and/or horizontal in any of the six possible orthogonally oriented positions thereof.

BRIEF DESCRIPTION OF THE DRAWINGS

The above and other objects and advantages of the present invention will become apparent from a consideration of the following description, taken in connection with the accompanying drawing, in which.

DETAILED DESCRIPTION OF THE INVENTION

Figure 1:
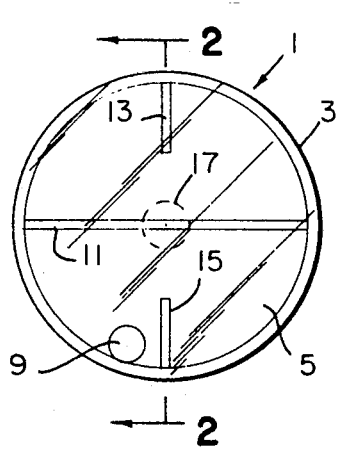
FIG. 1 is a front view of a level according to a first embodiment of the present invention, the appearance of the level from the side opposite thereof being identical.
Figure 2:
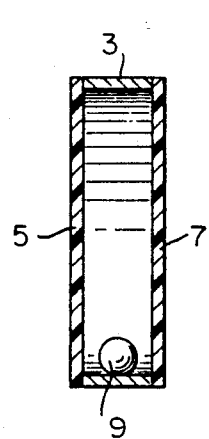
FIG. 2 is a cross sectional view on the line 2—2 of FIG. 1.

Referring now to the drawing in greater detail, and first to the embodiment of FIGS. 1 and 2 thereof, there is shown a level with a ball rolling on arcuate surfaces, according to the first embodiment of the present invention, indicated generally at 1, comprising a circular frame 3 two opposite sides of which are closed as by cementing thereto the peripheral edges of lenses 5 and 7. When the term "lens" is used in the present invention, it is used only in the sense of a glass or transparent cover, and not in the sense of a lens which changes the appearance of what is viewed through the lens. Thus, in the embodiment of FIGS. 1 and 2, the lenses 5 and 7 are flat and have parallel surfaces. In all cases, the lenses of the present invention will be transparent, and can be of glass or hard plastic. Hard plastic is preferred for economy and resistance to breakage.

The cage thus constituted by frame 3 and lenses 5 and 7 contains a ball 7 which is free to roll on the concave inner surfaces of frame 3. A straight line 11 is marked on each lens 5 and 7 and extends diametrically thereof; and short lines 13 and 15, in alignment with each other on a line perpendicular to line 11, are also provided on each lens 5 and 7. A central target mark 17 is also provided on each of lenses 5 and 7.

In use, the level 1 can be held in the hand of the user, disposed in a generally vertical plane, and manually rotated until mark 13 or 15 is in registry with ball 9. At this point, line 11 will constitute an artificial horizon, as it will be truly horizontal. The user can look through lenses 5 and 7, perhaps using target mark 17 to align the center of the field with an object to be viewed, and can easily determine the relationship to the horizontal of the surfaces adjacent the object viewed. For example, if the object viewed is the flag at a golf hole, then the line 11 will indicate whether the green surrounding the hole is horizontal, and if not, to what extent the green slopes. This will of course enable the golfer more accurately to plan his next stroke to the green or on the green.

Figure 3:
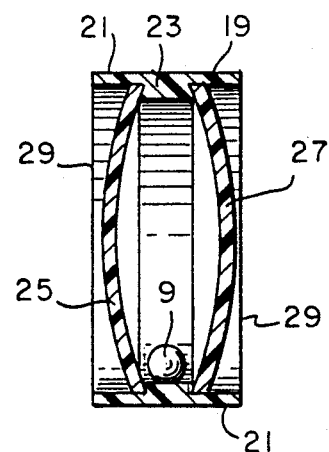
FIG. 3 is a view similar to FIG. 2 but showing a second embodiment of the invention.

FIG. 3 shows a cross section of a modified embodiment which has the functions of that of FIGS. 1 and 2, plus two additional functions. In FIG. 3, there is shown a frame 19 which is circular and has two oppositely extending circular flanges 21. Between the flanges 21 is a rib 23 of keystone cross section. Circular lenses 25 and 27 are provided, which are outwardly convex and hence inwardly concave and which are secured about their outer peripheries within the acute angled recesses provided between flanges 21 and rib 23.

The markings on lenses 25 and 27 are the same as those on lenses 5 and 7 and perform the same functions. However, in the embodiment of FIG. 3, the target marks 17 perform an entirely new function, because the edges of flanges 21 lie in two parallel planes perpendicular to the axis of the level. Thus, when the level is laid on either side, resting on either of the edges 29, the ball 9 will roll toward the lowermost point. If the surface on which edge 29 rests is perfectly horizontal then ball 9 will register precisely with mark 17; and of course any lack of registry between ball 9 and mark 17 will indicate a corresponding deviation from horizontal position of the surface on which the level rests. Because there are two opposite edges 29, the horizontality of either a downwardly facing surface or an upwardly facing surface can be determined without reversing the position of the level.

Figure 4:
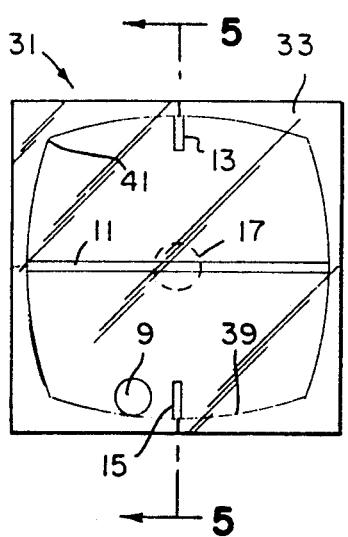
FIG. 4 is a view similar to FIG. 1 but showing a third embodiment of the invention.
Figure 5:
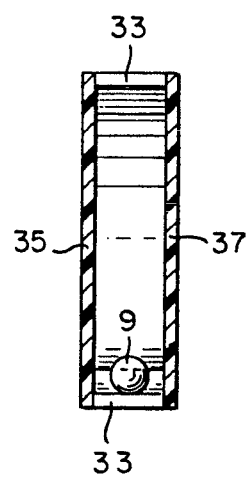
FIG. 5 is a cross sectional view on the line 5—5 of FIG. 4.

FIGS. 4 and 5 show a third embodiment of the invention, which is generally similar to that of FIGS. 1 and 2 but which adds four functions to that of FIGS. 1 and 2. In the embodiment of FIGS. 4 and 5, the frame 33 is in four symmetrical portions, which can of course be formed by molding as one section or two sections, to opposite sides of which flat square lenses 35 and 37 are secured as by cementing. The frame 33 defines on its inwardly facing surfaces four concave surfaces 39, which can be arcs of circles whose radii of curvature are substantially greater than half the length of each side of the square frame 33. Thus, the concave surfaces 39 meet in corners 41 at oblique angles.

The marks on the lenses and the ball 9 function as before. However, there are two principal differences in function between the embodiment of FIGS. 4 and 5, and that of FIGS. 1 and 2, as follows:

1. In the first place, the four external sides of frame 33 can be used to compare the position of a horizontal or vertical surface with the true horizontal or vertical, the registry or non-registry of the marks 11, 13 and 15 with the ball 9 giving a corresponding indication; and 2. The curvature of the concave surfaces 39 lying on a circular arc of much greater radius than in the case of FIGS. 1 and 2, the accuracy of the indication given by the position of ball 9 relative to the marks is improved.

Figure 6:
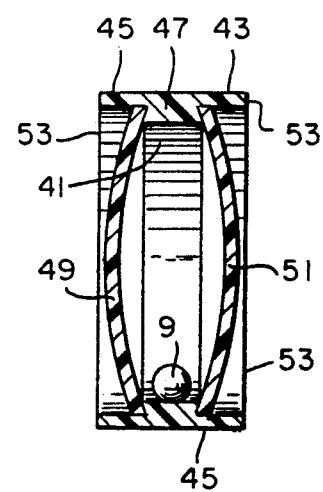
FIG. 6 is a view similar to FIG. 5 but showing a fourth embodiment of the invention.

FIG. 6 shows a fourth embodiment of the present invention, which differs from that of FIGS. 4 and 5 in the same ways that the embodiment of FIG. 3 differs from that of FIGS. 1 and 2. Thus, a square frame 43 has oppositely directed flanges 45 between which is disposed a rib 47 that can be the same as rib 23 except that it is externally square. The lenses 49 and 51 are also square but convex and are peripherally secured in the recesses between rib 47 and flanges 45. The flanges 45 are square and have free edges 53 that lie in parallel planes perpendicular to flanges 45.

The embodiment of FIG. 6 makes it possible to use the device in any of six positions: in four of those positions, one of the four flat sides of the frame 43 rests on an upwardly facing or downwardly facing horizontal surface or a vertical surface, and the position of the ball 9 relative to the associated line 11, 13 or 15 indicates any deviation of the measured surface from the vertical or horizontal. In the other two positions, the level rests on either of the edges 53, and the ball registers or not with the subjacent mark 17, thereby to indicate the deviation of the contacted upwardly facing or downwardly facing surface from the horizontal.

In view of the foregoing, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A level comprising two spaced opposite sides bounded by a peripheral frame, a spherical ball free to roll between said sides within said frame, one of said sides comprising a transparent lens having a spherically concave inner surface and a spherically convex outer surface and a mark at the center of said lens which is visible from outside the level, the other of said sides having outer surfaces defining a first plane which is horizontal when said ball rests by gravity on said mark, the frame having an outwardly extending flange that has a free edge that lies in a second plane parallel to said first plane, said lens being disposed entirely between said planes.

2. A level as claimed in claim 1, the other of said sides also comprising a transparent lens having a spherically concave inner surface and a spherically convex outer surface, the concave sides of the two lenses facing each other, said frame having oppositely outwardly extending said flanges which define said first and second planes, both said lenses being disposed entirely between said planes.

* * * * *